United States Patent

Inokuchi

[11] Patent Number: 4,739,159
[45] Date of Patent: Apr. 19, 1988

[54] OPTICAL READ OUT APPARATUS USING A ROOF MIRROR LENS ARRAY

[75] Inventor: Toshiyuki Inokuchi, Kanagawa, Japan

[73] Assignee: Ricoh Company, Ltd., Tokyo, Japan

[21] Appl. No.: 865,858

[22] Filed: May 22, 1986

[30] Foreign Application Priority Data

May 29, 1985 [JP] Japan ................................ 60-116258

[51] Int. Cl.[4] .............................................. H01J 3/16
[52] U.S. Cl. .................... 250/216; 250/239; 250/578; 358/293
[58] Field of Search ........ 250/216, 239, 578, 234–235; 358/293, 294, 288

[56] References Cited

U.S. PATENT DOCUMENTS

| | | | |
|---|---|---|---|
| 4,220,978 | 9/1980 | Rhyins et al. | 358/293 |
| 4,583,126 | 4/1986 | Stoffel | 250/578 |
| 4,587,418 | 5/1986 | Shirakosh et al. | 250/216 |
| 4,644,159 | 2/1987 | Miura | 250/216 |

*Primary Examiner*—Edward P. Westin
*Assistant Examiner*—Khaled Shami
*Attorney, Agent, or Firm*—Oblon, Fisher, Spivak, McClelland & Maier

[57] ABSTRACT

A document readout device reads out a document by forming an image of a linear area of the document on an unmagnification sensor through an image-forming optical system. The document readout device has a roof mirror array, a lens array, an optical-path separator, one or two mirror members, a housing, an unmagnification sensor, and one or two line illuminating devices. The housing has a pair of slits, one of which is covered by the unmagnification sensor, with the other slit being positioned for introducing light into the housing. The roof mirror array, the lens array, the optical-path separator, and the mirror member or members are retained in the housing in certain mutual positional relationship. The unmagnification sensor and the line illuminating unit or units are integrally mounted on the housing. The roof mirror array, the lens array, and the optical-path separator jointly constitute the image-forming optical system. An image-forming light ray from the image-forming optical system is guided by the mirror member or members toward the unmagnification sensor.

8 Claims, 3 Drawing Sheets

OPTICAL READ OUT APPARATUS USING A ROOF MIRROR LENS ARRAY

BACKGROUND OF THE INVENTION

The present invention relates to a document readout device, and more particularly to a document readout device for converting information on a document to electric signals.

One recently proposed document readout device is illustrated in FIG. 5 of the accompanying drawings. An original document O bearing information to be read out is placed on a support plate 30 of glass. The document readout device includes an image-forming optical system 40, an unmagnification sensor 50, and a line illuminating unit 60. The direction normal to the sheet of FIG. 5 will hereinafter be referred to as a Z direction.

The image-forming optical system 40 comprises a roof mirror array 42, a lens array 44, and a right-angled mirror 46, and a housing 48 accommodating the roof mirror array 42, the lens array 44, and the right-angled mirror 46 in mutually spaced relationship. The roof mirror array 42 is of a structually integral optical component having an array of roof mirrors arranged at a constant pitch in the Z direction, each of the roof mirrors having a ridge extending vertically in FIG. 5. The lens array 44 includes an array of lenses arranged at the same pitch as that of the roof mirrors of the roof mirror array 42. Each of the lenses of the lens array 44 is optically associated with one of the roof mirrors of the roof mirror array 42.

Each of the lenses of the lens array 44 and the corresponding roof mirror combined therewith jointly constitute a retrodirective image-forming optical system for forming an unmagnified iamge of an object on a surface of the object. Therefore, the roof mirror array 42 and the lens array 44 jointly constitute an array of such retrodirective image-forming optical systems.

The right-angled mirror 46 comprises two plane mirrors which are elongate in the Z direction, the plane mirrors having mirror surfaces normal to each other. The roof-mirror array 42, the lens array 44, and the right-angled mirror 46 are retained in the housing 48 as shown in FIG. 5. The housing 48 has a pair of slits extending in the Z direction and aligned vertically with each other, with cover glass strips 41, 43 fitted in the respective slits.

The original document O is fed by a document feeder (not shown) in the direction of the arrow (FIG. 5) while in contact with the support plate 30. As the document O is thus fed along, a slit ray of light extending in the Z direction is applied from the light illuminating unit 60 to the document O. Light reflected from the illuminated area of the document O enters the image-forming optical system 40 through the cover glass strip 41 in the upper slit of the housing 48 and is reflected to the right by the right-angled mirror 46. Then, the light passes through the lens array 44 and is reflected by the roof mirror array 42 back through the lens array 44 to the right-angled mirror 46. The light is reflected by the right-angled mirror 46 to exit from the image-forming optical system 40 through the cover glass strip 43. The light then falls on the unmagnification sensor 50 to form an unmagnified erect image of the illuminated area of the document O. The unit magnification sensor or unmagnification sensor 50 comprises a self-scanned photosensor composed of an array of small photosensor elements arranged in the Z direction. The length for which the photosensor elements are arranged is selected to be equal to or larger than the width of the document O in the Z direction. The information on the document O can be successively read out and converted to electric signals by cyclically scanning the unmagnification sensor 50 in timed relation to the travel of the document O.

With the document readout device shown in FIG. 5, the area of the document O that is illuminated by the line illuminating unit 60 and the light detecting area on the unmagnification sensor 50 are required to be in proper image-forming relationship through the intermediary of the image-forming optical system 40. It has been tedious and time-consuming to adjust the relative positions of the line illuminating unit 60, the image-forming optical system 40, and the unmagnification sensor 50.

The photosensor of the unmagnification sensor 50 has heretofore been fabricated of an amorphous semiconductor driven by a driver circuit located outside of the unmagnification sensor 50. Leads from the individual photosensor elements are patterned on the photosensor baseboard and are relatively large in size.

Recently, there has been developed a mass-produceable unmagnifcation sensor in which driver circuits are arranged in line on a photosensor baseboard, the unmagnification sensor being of about the same size as that of the cover glass strips 41, 43 shown in FIG. 5.

SUMMARY OF THE INVENTION

It is an object of the present invention to provide a document readout device which includes components that are positionally adjustable with ease and which is relatively small in overall size.

A document readout device according to the present invention includes a roof mirror array, a lens array, an optical-path separator, a mirror member, a housing, an unmagnification sensor, and a line illuminating unit. The unmagnification sensor has an array of driver circuits arranged in line on a photosensor baseboard.

Like the roof mirror array 42 shown in FIG. 5, the roof mirror array is an integrated structure having roof mirrors arranged at a constant pitch. The lens array is also an integrated structure and has an array of lenses arranged at a constant pitch, like the lens array 44 shown in FIG. 5. The pitch at which the lenses of the lens array are arranged is the same as that at which the roof mirrors are arrayed. Each of the lenses is optically associated with one of the roof mirrors of the roof mirror array, and they jointly serve as a retrodirective image-forming optical system. The optical-path separator is disposed between the roof mirror array and the lens array for separating optical paths between the lenses and the corresponding roof mirrors. Stated otherwise, the optical-path separator separates the optical paths of the retrodirective image-forming optical system that extend between the lenses and the roof mirrors associated respectively therewith. Therefore, a light ray falling on a lens is directed only to the roof mirror associated therewith, and is prevented from falling on the other roof mirrors.

The mirror member, which may be composed of one mirror or of two mirrors, is positioned opposite to and remotely from the roof mirror array with the lens array interposed therebetween, with the mirror member extending longitudinally along the lens array.

The housing retains therein the roof mirror array, the lens array, the optical-path separator, and the mirror member in a fixed positional relationship. The housing has a pair of slits extending longitudinally along the lens array. One of the slits is positioned in an image-forming plane of the roof mirror array and the lens array. The unmagnification sensor has an array of photosensor elements providing a light detecting area, and is mounted in a fixed manner on the housing such that the light detecting area thereof covers the respective slit. The other slit allows light reflected from a document to enter the housing. The line illuminating unit is fixedly mounted in a certain posture on the housing in the vicinity of this other slit. An additional line illuminating unit may be mounted on the housing. The line illuminating unit, the unmagnification sensor, and the image-forming optical system which comprises the roof mirror array, the optical-path separator, the lens array, and the mirror member, are integrally combined in a fixed positional relationship. Therefore, an image of the document in a document readout position can automatically be formed on the unmagnification sensor simply by positioning the document readout device with respect to the document readout position.

With the above arrangement, the line illuminating unit can be brought into image-forming relationship with the unmagnification sensor through the image-forming optical system simply by adjusting positionally the document readout device with respect to the document readout position. Such positional adjustment can be effected with a high degree of accuracy. Since the image-forming optical system, the unmagnification sensor, and the line illuminating device are of a unitary construction, the document readout device is relatively small in overall size. The document readout device is inexpensive to manufacture insomuch as the housing serves as the support for the unmagnification sensor and the line illuminating unit or units.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
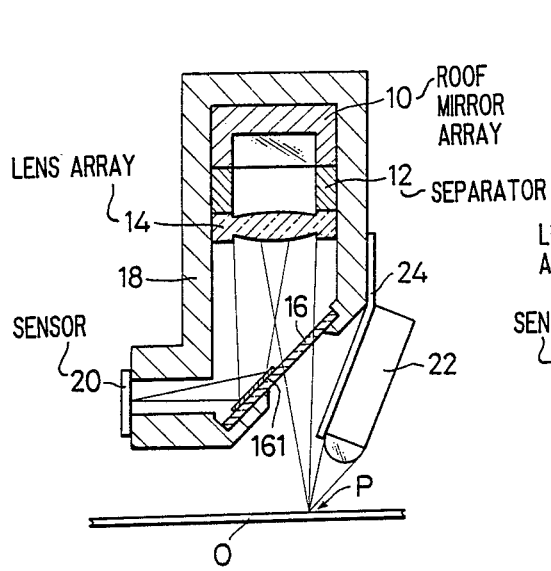
FIG. 1 is a transverse cross-sectional view of a document readout device according to one embodiment of the present invention.

The present invention will hereinafter be described with reference to FIGS. 1 through 4 which illustrate document readout devices according to four different embodiments of the present invention. The direction normal to the sheets O of FIGS. 1 through 4 will be referred to as a Z direction which is the same as the longiduinal direction of a lens array in each of the embodiments. Like or corresponding reference characters denote like or corresponding parts in FIGS. 1 through 4. The opposite ends of each document readout device in the Z direction are closed by side walls (not shown).

As shown in FIG. 1, a document readout device includes a roof mirror array 10, an optical-path separator 12, a lens array 14, a mirror member 16, a housing 18, an unmagnification sensor 20, and a line illuminating unit 22. Denoted at O is an original document bearing information to be read out by the document readout device.

The roof mirror array 10 comprises an array of roof mirrors arranged at a constant pitch in the Z direction, and the lens array 14 comprises an array of lenses arranged at a constant pitch in the Z direction. The roof mirrors and the lenses are in one-to-one correspondence. The optical-path separator 12 comprises an elongate plate extending in the Z direction and having a longitudinal array of circular holes defined therein at a constant pitch which is the same as that at which the lenses are arranged. Each of the circular holes is positioned between one lens and with the roof mirror being optically associated therewith.

The housing 18 has a pair of slits extending in the Z direction, with one of the slits being covered by the unmagnification sensor 20 in a fixedly mounted position on the housing 18. The unmagnification sensor 20 has an array of photosensor elements arranged in the Z direction. The other slit of the housing 18 serves to allow light to enter the housing 18 and is covered by the mirror member 16. Therefore, the interior of the housing 18 is sealed off by the unmagnification sensor 20 and the mirror member 16 to prevent the entry of dust.

A support member 24 is secured to the housing 18. A line illuminating unit 22 is fixed to this support member 24. Therefore, the line illuminating unit 22 is fixed with respect to the housing 18.

The line illuminating unit 22 comprises an LED array and a cylindrical lens combined therewith. When the line illuminating unit 22 is energized, a slit ray of light is emitted therefrom to illuminate an area P of the document O in the Z direction. Thus, the light from the LED array is caused by the cylindrical lens to converge into the slit ray in the Z direction on the document area P.

Light reflected from the illuminated area P of the document O passes through the mirror member 16 and the lens array 14 onto the roof mirror array 10. This light is then reflected by the roof mirror array 10 to go through the lens array 14 onto a mirror surface 161 which has been formed, by vacuum deposition, on one side of a transparent plate of the mirror member 16. After being reflected by the mirror surface 161, the light falls on the light detecting area of the unmagnification sensor 20 to form an unmagnified erect image of the illuminated area P of the document O on the light detecting area.

Stated otherwise, the position where the illuminating light is converged by the light illuminating unit 22 and the light detecting area of the unmagnification sensor 20 are held in unmagnified-image-forming relationship by the lens array 14 and the roof mirror array 10. The unmagnification sensor 20 and the line illuminating unit 22 are positioned with respect to the housing 18 to meet the above unmagnified-image-forming relationship.

The highest portion of the housing 18 is spaced from the surface of the document O by 41 mm, whereas the optimal maximum width of the document readout device in the horizontal direction in FIG. 1 is 30 mm.

Figure 2:
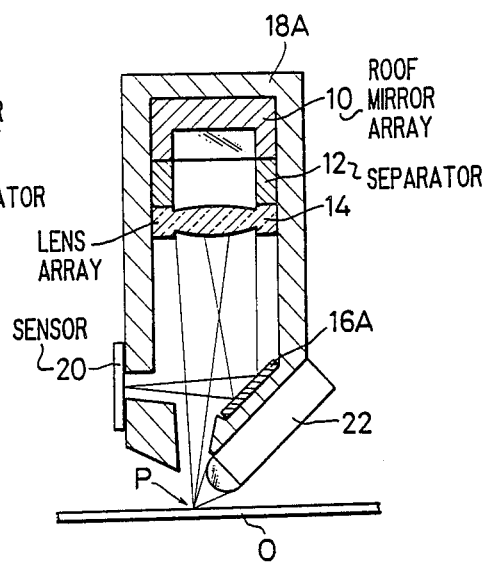
FIG. 2 is a transverse cross-sectional view of a document readout device according to another embodiment of the present invention.

FIG. 2 shows a document readout device according to another embodiment of the present invention. The document readout device includes a housing 18A having an open slit for introducing light into the housing 18A, and a mirror member 16A comprising a plane mirror that is elongate in the Z direction. The slit and the mirror member 16A are positioned such that the light ray coming from the document O toward the lens array 14 is crossed by the light ray traveling from the mirror member 16A toward the unmagnification sensor 20. Therefore, a space is made available behind the mirror member 16A for the line illuminating unit 22 that is directly mounted on the housing 18A. The optimal maximum width of the document readout device in the horizontal direction in FIG. 2 is 21 mm. The highest portion of the housing 18A is spaced from the document surface by 41 mm as with the embodiment of FIG. 1.

Figure 3:
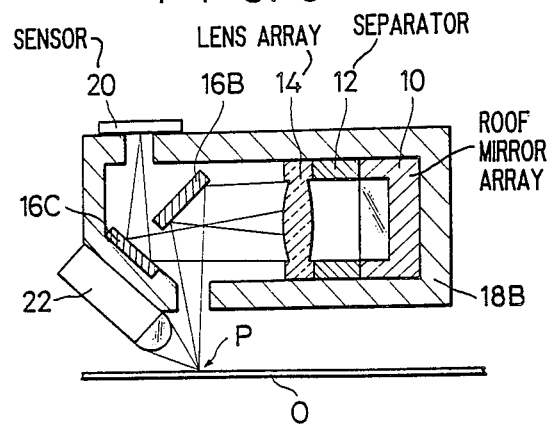
FIG. 3 is a transverse cross-sectional view of a document readout device according to still another embodiment of the present invention.

According to still another embodiment shown in FIG. 3, an open slit is defined in a housing 18B for introducing light into the housing 18B. The mirror member comprises two plane mirrors 16B, 16C. The plane mirror 16B is positioned in confronting relation to the open slit, whereas the plane mirror 16C is positioned in confronting relation to the slit covered by the unmagnification sensor 20. The open slit and the plane mirrors 16B, 16C are arranged such that the light ray coming from the document O toward the plane mirror 16B is crossed by the light ray from the lens array 14 to the plane mirror 16C. As a consequence, a space is provided behind the plane mirror 16C for the line illuminating unit 22, so that the document readout device is relatively small in the vertical direction. The distance from the document surface to the highest portion of the document readout device is 25 mm, whereas the optimal maximum width of the document readout device in the horizontal direction of FIG. 3 is 38 mm.

Figure 4:
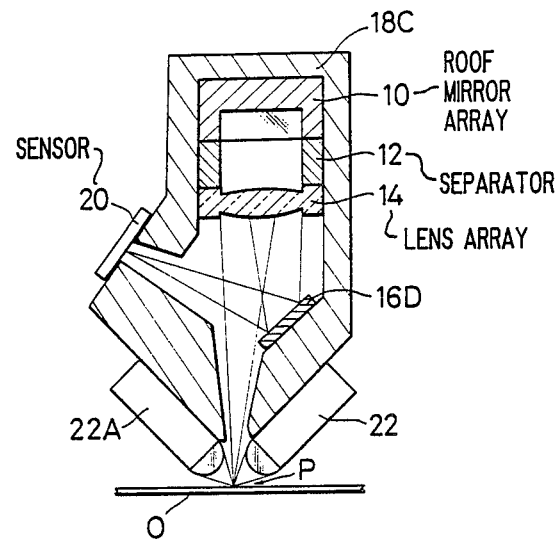
FIG. 4 is a transverse cross-sectional view of a document readout device according to a still another embodiment of the present invention.
Figure 5:
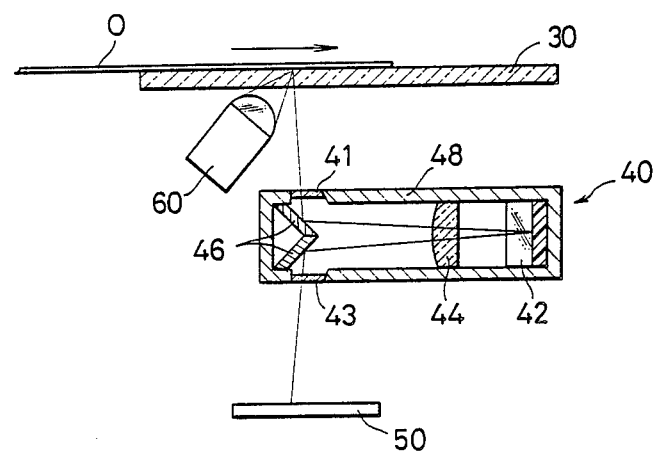
FIG. 5 is a transverse cross-sectional view of a conventional document readout device.

FIG. 4 shows a still further embodiment in which a housing 18C has an open slit for introducing light from the document O and the mirror member comprises a plane mirror 16D. The plane mirror 16D is so arranged in the housing 18C as to reflect light from the lens array 14 at an acute angle toward the unmagnification sensor 20. This arrangement allows two line illuminating units 22, 22A to be mounted on the housing 18C, with the line illuminating unit 22A being of the same construction as that of the line illuminating unit 22.

Figure 6:
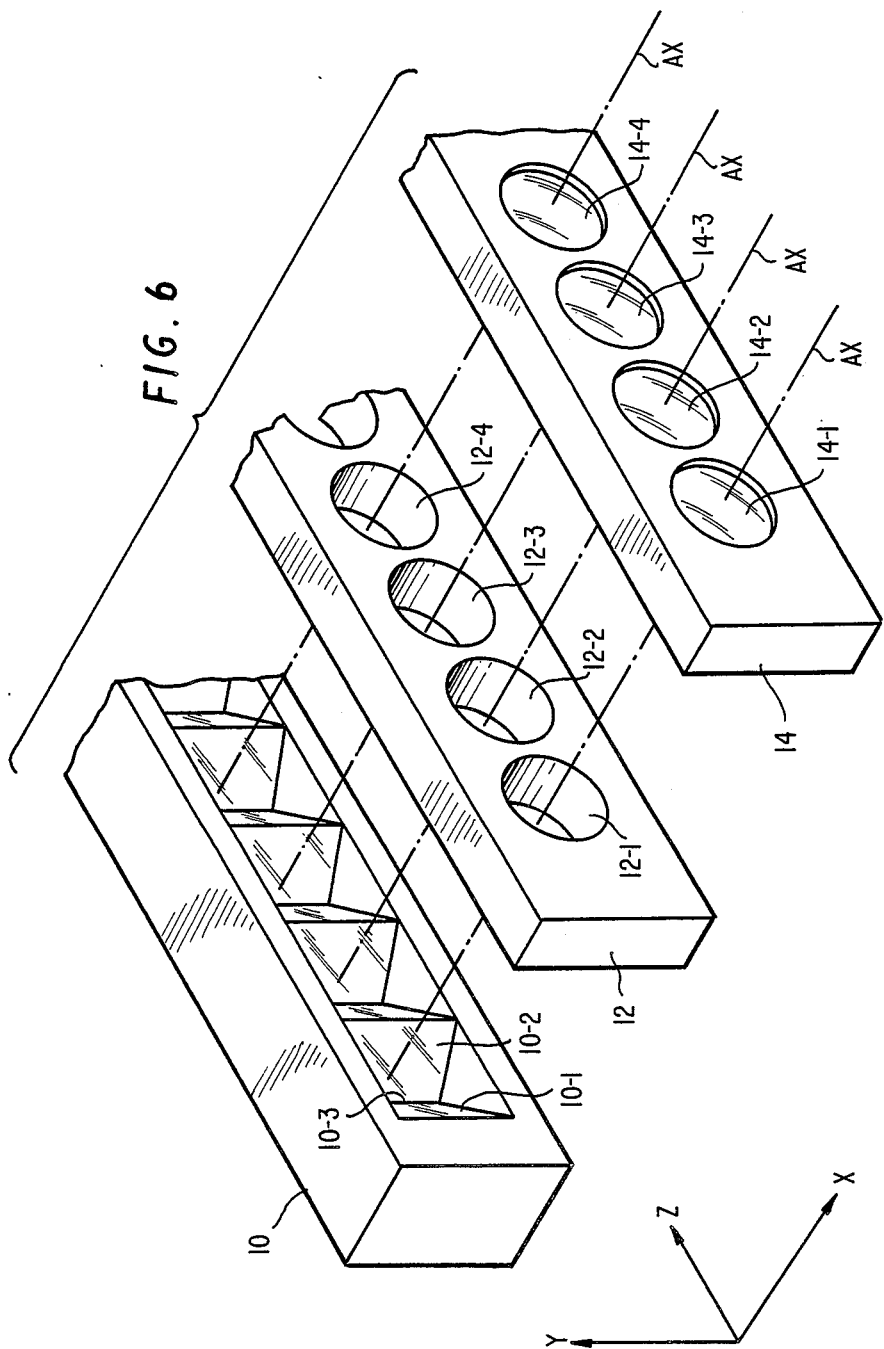
FIG. 6 is a perspective view of a document read out device according to the present invention.

FIG. 6 is a perspective view of the present invention and shows the full array of elements 10, 12 and 14, namely the roof mirror array, optical path separator and lens array, respectively. This arrangement is applicable to any of the embodiments shown in FIGS. 1-4.

The document readout devices shown in FIGS. 2 through 4 function in the same manner as the document readout device discussed above with respect to FIG. 1.

In the embodiments of FIGS. 2, 3, and 4, a cover glass strip may be fitted in the slit for introducing light to guard against the entry of dust. The mirror member may be provided with a wavelength selecting capability.

The line illuminating unit may comprise a combination of an LED array and a cylindrical lens, or a fluorescent lamp. While the document O is shown as being positioned in direct opposite relation to the document readout device, a support plate of glass may be disposed between the document O and the document readout device for stabilizing the area of the document which is being read out.

Although several embodiments have been shown and described, it should be understood that many changes and modifications may be made therein without departing from the scope of the appended claims.

What is claimed is:

1. An optical read out apparatus using a roof mirror array comprising:
   said roof mirror array being composed of an array of roof mirrors arranged at a constant pitch;
   a lens array composed of an array of lens arranged at the same pitch as said constant pitch of said roof mirrors, each of said lenses in said lens array being optically associated with one of said roof mirrors;
   an optical-path separator disposed between said roof mirror array and said lens array for separating the optical paths between said roof mirrors and lens associated therewith;
   at least one additional mirror member disposed opposite to and remotely from said roof mirror array with said lens array interposed therebetween, said mirror member extending in the longitudinal direction of said lens array;
   a housing having first and second slits extending in the longitudinal direction of said lens array, with said roof mirror array, said lens array, said optical-path separator, and said additional mirror member being retained in said housing;
   a unit magnification sensor mounted on said housing and having a light detecting area covering said first slit, said additional mirror member reflecting an image from the roof mirror lens array to the unit magnification sensor;
   at least one line illuminating unit mounted on said housing in the vicinity of said second slit; and
   one of said first and second slits of said housing being positioned in an image-forming plane of said lens array and said roof mirror array, with the other of said slits being positioned for introducing light into said housing, said unit magnification sensor and said line illuminating unit being positioned with respect to said housing in unit magnification-image-forming relationship.

2. An optical readout device according to claim 1, wherein said light illuminating unit comprises: a single line illuminating unit.

3. An optical readout device according to claim 1, wherein said additional mirror member comprises: a transparent plate and a mirror surface formed thereon by vacuum deposition, providing a transparent portion and a mirror portion, said mirror member being disposed in covering relation to said first slit.

4. An optical readout device according to claim 1, wherein said additional mirror member comprises: a single plane mirror.

5. An optical readout device according to claim 1, wherein said additional mirror member comprises: two plane mirrors, one of said two plane mirrors being positioned in confronting relation to said first slit and the other plane mirror being positioned in confronting relation to said second slit.

6. An optical readout device according to claim 1, comprising: two line illuminating units, with said mirror member comprising: a single plane mirror arranged for reflecting light at an acute angle toward said unit magnification sensor.

7. An optical readout device according to claim 1, wherein said line illuminating unit comprises: an LED array and a cylindrical lens combined therewith.

8. An optical read out device according to claim 1, wherein said additional mirror member also reflects light to said roof mirror lens array.

* * * * *